(12) United States Patent
Lee et al.

(10) Patent No.: US 7,203,369 B2
(45) Date of Patent: Apr. 10, 2007

(54) METHOD FOR ESTIMATING MOTION BY REFERRING TO DISCRETE COSINE TRANSFORM COEFFICIENTS AND APPARATUS THEREFOR

(75) Inventors: Seung-Cheol Lee, Seoul (KR); Hwa-Soon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 747 days.

(21) Appl. No.: 10/444,456

(22) Filed: May 22, 2003

(65) Prior Publication Data
US 2004/0032987 A1    Feb. 19, 2004

(30) Foreign Application Priority Data
Aug. 13, 2002    (KR) ...................... 10-2002-0047739

(51) Int. Cl.
*G06K 9/36*    (2006.01)
(52) U.S. Cl. ..................................... 382/236
(58) Field of Classification Search ........ 382/232–233, 382/236, 238, 239, 240, 248, 250; 375/240.03, 375/240.12, 240.16, 240.23; 348/419.1, 348/699, 390.1
See application file for complete search history.

(56) References Cited

U.S. PATENT DOCUMENTS

| | | | |
|---|---|---|---|
| 5,121,216 A | | 6/1992 | Chen et al. |
| 5,576,767 A | | 11/1996 | Lee et al. |
| 5,719,986 A | * | 2/1998 | Kato et al. ................... 386/109 |
| 5,986,709 A | | 11/1999 | Lee |
| 6,040,865 A | * | 3/2000 | Kato et al. ............. 375/240.16 |
| 6,100,932 A | | 8/2000 | Boyce et al. |
| 6,151,360 A | * | 11/2000 | Kato et al. ............. 375/240.03 |
| 6,167,087 A | * | 12/2000 | Kato ..................... 375/240.03 |
| 6,243,417 B1 | * | 6/2001 | Obikane et al. ....... 375/240.03 |

FOREIGN PATENT DOCUMENTS

| | | |
|---|---|---|
| CN | 1175852 A | 3/1998 |
| EP | 0 684 738 | 5/1995 |
| WO | WO 99/52297 | 10/1999 |

* cited by examiner

*Primary Examiner*—Jose L. Couso
(74) *Attorney, Agent, or Firm*—The Farrell Law Firm

(57) ABSTRACT

Disclosed is a method for encoding a video signal through discrete cosine transform (DCT) and motion estimation (ME) and an apparatus therefor. The method for encoding the video signal simplifies the ME with reference to DCT coefficients. In a method for estimating motion in a video frame compression system using DCT, flatness degrees of the blocks is determined according to the number of DCT coefficients having a non-zero value among DCT coefficients transformed in units of blocks. A reference frame is formed by recovering video frame data from some or all of the DCT coefficients corresponding to the flatness degrees of the blocks. Precision of motion estimation (ME) for a current macro block (MB) of a current video frame is dynamically changed corresponding to the flatness degree of the reference frame.

18 Claims, 8 Drawing Sheets

METHOD FOR ESTIMATING MOTION BY REFERRING TO DISCRETE COSINE TRANSFORM COEFFICIENTS AND APPARATUS THEREFOR

PRIORITY

This application claims priority to an application entitled "Method for estimating motion by referring to discrete cosine transform coefficients and apparatus therefor" filed in the Korean Industrial Property Office on Aug. 13, 2002 and assigned Serial No. 2002-47739, the contents of which are hereby incorporated by reference herein.

BACKGROUND OF THE INVENTION

1. Field of the Invention

The present invention relates to a method for encoding a video signal through discrete cosine transform and motion estimation and an apparatus therefor, and more particularly, to a method for encoding a video signal for simplifying motion estimation by referring to discrete cosine transform coefficients and an apparatus therefor.

2. Description of the Related Art

In general, a video signal is compressed by two methods. One is intraframe compression and the other is intraframe compression. According to intraframe compression, information is compressed in a video frame. A discrete cosine transform (DCT) is included in the intraframe compression. According to the DCT, correlation of data is removed through two-dimensional pivoting. An input frame is divided in units of blocks and an image of each block is transformed from a spatial region to a frequency region. The transformed data tend to cluster on one side, a lower region. Spatial overlap is removed by quantizing only the clustered data through use of a quantizer.

According to the intraframe compression, temporal overlap is removed by encoding an image on the basis of differences in corresponding pixel values between continuous video frames. Because people or objects move only in a center of a screen without changing in a background in temporally continuous images, it is possible to remove the temporal overlap using such a characteristic. That is, it is possible to significantly reduce an amount of data when a screen does not change or even though a screen changes by not encoding a similar portion and referring to a previous image. Such a method is referred to as a motion estimation (ME) technology. The ME technology is used as the intraframe compression method in almost all image encoding standards such as moving picture experts group (MPEG)-4 as well as H.261, MPEG-1, MPEG-2, and H.263.

FIG. 1 illustrates a conventional encoding system 100 for compressing a digital video signal, for example, an image encoding system of MPEG-2 method. A conventional method for compressing an image through the DCT and the ME with reference to FIG. 1 will now be described.

A frame-type input video signal is input to a frame memory 101. The frame is stored in the frame memory 101 as continuous blocks of pixel data so as to be processed in units of blocks. A frame block commonly has pixel sizes of 8×8 to 16×16. For the convenience of explanation, a block having a pixel size of 8×8 will be described. However, the present invention can be applied to a block of another pixel size.

A DCT 103 discrete cosine transforms an input video signal read by the frame memory 101 in units of blocks and generates DCT coefficients. A quantizer 105 quantizes the generated DCT coefficients. A bit ratio controller 117 determines a quantization table to be used for quantization by the quantizer 105 in order to adjust a target transmission bit ratio to thus control a bit ratio. The quantized DCT coefficients are scanned in zigzags and are input to a variable length coder 107. The variable length coder 107 transforms the scanned quantized DCT coefficients into variable length encoded data and outputs the data as an encoded continuous bit stream through a bit stream generator, not shown.

The output of the quantizer 105 is also input to an inverse-quantizer 109. The DCT coefficients output from the inverse-quantizer 109 are inverse discrete cosine transformed by an inverse discrete cosine transform (IDCT) 111 and become recovered pixel data in units of blocks. The recovered pixel data in units of blocks are stored in a frame memory 113. All blocks of a video frame are sequentially recovered and are stored in the frame memory 113. The recovered image frame stored in the frame memory 113 is used as a reference frame for ME.

After all blocks of a first video frame are processed by the encoding system 100, a second video frame is input to the encoding system 100. A motion estimator 115 searches for a region which is the most similar to a first macro block (MB) of the second frame in a search region of a reference frame stored in the frame memory 113. In general, the search region includes a plurality of candidate MBs. The motion estimator 115 moves a reference region having the same pixel size with that of the MB up and down and right and left in the search region in units of half pixels and compares the pixels of the MB with the pixels of the reference region. The MB commonly has a size of 8×8 or 16×16. Various common searching algorithms such as a full searching block matching algorithm (FBMA), a three step search (TSS), diamond search, and hierarchical motion estimation or block matching techniques are used. A motion vector (MV) illustrating a relationship between the position of the most similar reference region of the searched reference frame and the MB of a second image frame is determined.

A difference between the first MB of the second frame and the most similar reference region of the reference frame is obtained by an adder 119. The difference is encoded by the DCT 103, the quantizer 105, and the variable length coder 107 together with the MV. The difference and the MV are obtained by separate apparatuses and separate processes. However, the MV and the difference can be obtained in one process. The difference is input to the inverse-quantizer 109 and the IDCT 111 and is stored in the frame memory 113 as the recovered pixel data for the ME of the next frame. The processes are sequentially applied to the all blocks of the second frame in their entirety.

As mentioned above, a reference frame used for the ME is not the image frame of the original but a recovered frame from the decoding of the already encoded, that is, quantized DCT coefficients. This is for minimizing an error between an encoding system and a decoding system by receiving encoded image data from the decoding system and undergoing the same processes as those of encoding. A N×N inverse discrete cosine transform equation used for the decoding process is as follows.

$$f(x, y) = \frac{2}{N} \sum_{u=0}^{N-1} \sum_{v=0}^{N-1} C(u)C(v)F(u, v)\cos\frac{(2x+1)u\pi}{2N} \cos\frac{(2y+1)v\pi}{2N} \quad \text{[Equation 1]}$$

wherein, $C(u), C(v) = \begin{cases} \frac{1}{\sqrt{2}} & \text{for } u, v = 0 \\ 1 & \text{otherwise} \end{cases}$ and F(u,v) is a reference frame function that provides decoded DCT coefficients from the decoding of the previously encoded (quantized) DCT coefficients, and u and v are coordinates in the DCT block.

[Equation 1] has calculation complexity of $O(n^3)$. The entire quantized DCT coefficients are inverse discrete cosine transformed by [Equation 1]. As a result, a larger amount of operations is used than in a case where the original image frame is used as the reference frame. Also, efficiency of an encoding method deteriorates. Because the search region of the reference frame and all of the pixels of the current MB are compared with each other by the ME 115, time required for estimating motion and the amount of operations increase.

A portable system such as a mobile terminal has restricted operation ability and power supplying ability. An excessive amount of operations required for the ME is a heavy burden for the portable system. However, in the case of transmitting a moving picture through a radio channel, a significantly large amount of data is generated. Meanwhile, a usable frequency band is restricted. In order to transmit significantly large moving picture data by a restricted frequency band, it is essential to reduce the amount of transmitted data using ME. Therefore, it is necessary to compress moving picture data using the ME and to reduce the excessive amount of operations required for the ME in order to reduce the amount of transmitted data.

SUMMARY OF THE INVENTION

Accordingly, the present invention has been made to solve the above-mentioned problems occurring in the prior art, and an object of the present invention is to provide a method for reducing an amount of operations required for motion estimation (ME) while maintaining high picture quality and compression efficiency in a system for encoding a video image signal through discrete cosine transform and ME and an apparatus therefor.

Another object of the present invention is to provide a method for reducing an amount of said operations by recovering a reference frame for the ME in consideration of an image in a system for encoding a video image signal through discrete cosine transform and the ME and an apparatus therefor.

Still another object of the present invention is to provide a method for reducing an amount of said operations by dynamically controlling a pixel comparison precision between a current image and a reference image and a search precision in consideration of characteristics of an image in a system for removing temporal overlap between moving picture images through the ME and an apparatus therefor.

In order to accomplish these objects, there is provided a method for estimating motion in a video frame compression system using discrete cosine transform (DCT). The method comprises the steps of determining a flatness degree of the blocks according to the number of DCT coefficients having a non-zero value among DCT coefficients transformed in units of blocks. A reference frame is formed by recovering video frame data from some or all of the DCT coefficients corresponding to the flatness degree of the blocks. Precision of motion estimation (ME) for a current macro block (MB) of a current video frame is dynamically changed according to the flatness degree of the reference frame.

There is provided a system for compressing a video frame in order to transform input video data input in units of blocks from a spatial region to a frequency region by a DCT and encoding DCT coefficients generated in the transform process. The system comprises a flatness degree determiner for determining the flatness degrees of corresponding blocks according to the values of the DCT coefficients. An IDCT inverse transforms the DCT coefficients from a frequency region to a spatial region with reference to the flatness degree and inverse discrete cosine transforming video data. A motion estimator estimates the region which is the most similar to current video data among the recovered video data with reference to the flatness degree. An adder inputs errors of the motion estimated region and the current video data to the DCT.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
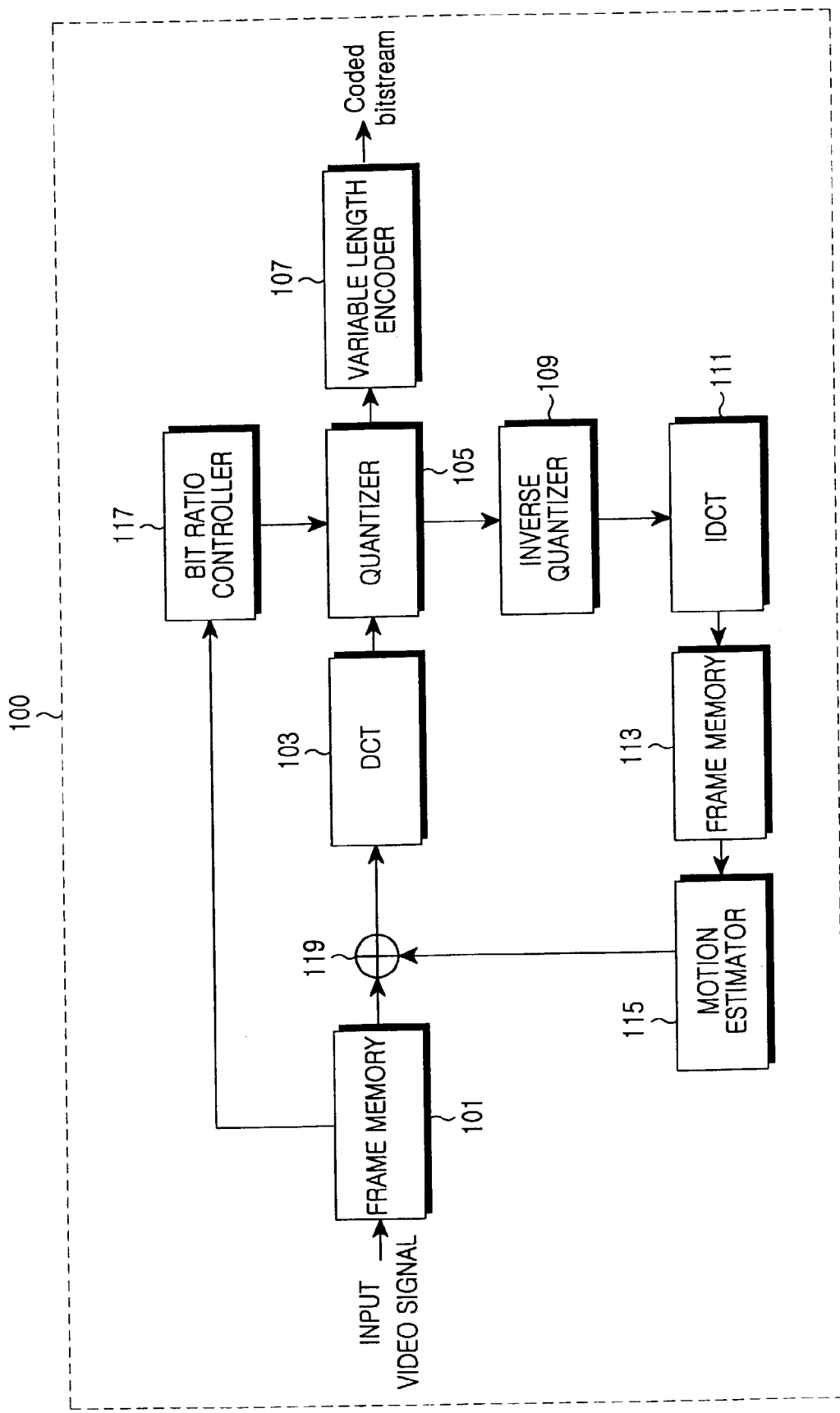
FIG. 1 is a block diagram illustrating a conventional encoding system for compressing a digital video signal.

Hereinafter, preferred embodiments of the present invention will be described with reference to the accompanying drawings. The same elements are denoted by the same reference numerals and signs even though they are displayed on different drawings. In the following description of the present invention, a detailed description of known functions and configurations incorporated herein will be omitted in order to focus on the subject matter of the present invention.

Figure 2:
FIG. 2 illustrates images recovered from different numbers of decoded discrete cosine transform (DCT) coefficients.
Figure 2:
Figure 2:
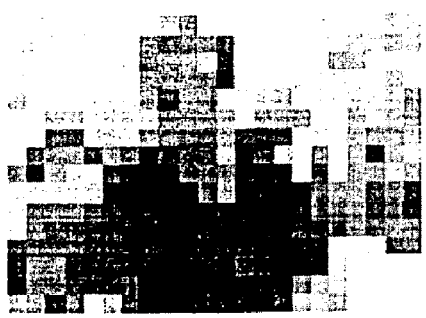
Figure 2:
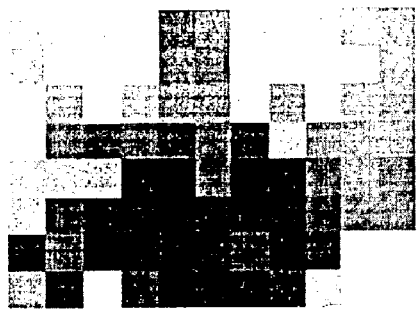
Figure 2:
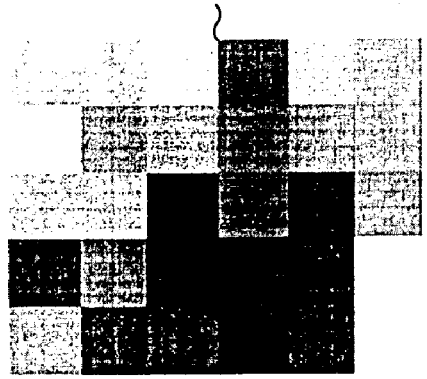

FIG. 2 illustrates images recovered with different numbers of decoded discrete cosine transform (DCT) coefficients when encoded pixel data, that is, quantized DCT coefficients are inverse quantized and inverse discrete cosine transformed, that is, decoded, to thus be recovered to original pixel data. FIG. 2 shows a case where a block size is 8×8. Reference numeral 201 denotes an image recovered when 6×6, 36 DCT coefficients are transformed among 8×8 blocks. Reference numeral 203 denotes an image recovered when 4×4, 16 DCT coefficients are decoded. Reference numeral 205 denotes an image recovered when 3×3, 9 DCT coefficients are decoded. Reference numeral 207 denotes an image recovered when 2×2, 4 DCT coefficients are decoded. Reference numeral 209 denotes an image recovered when 1×1, 1 DCT coefficient is decoded. As illustrated, errors are not generated in some blocks, however, severe errors are generated in other blocks, according to characteristics of the respective blocks when only some DCT coefficients are decoded.

In typical images, most DCT coefficients resulting from DCT and quantization processes have a zero value. Because the DCT coefficients are of a low frequency, that is, DCT DC coefficients mainly have a non-zero value, non-zero DCT coefficients are commonly distributed in a low frequency region of the left upper end of a 8×8 block. Meanwhile, high frequency DCT coefficients distributed in the right lower end of the block, that is, DCT AC coefficients mainly have a zero value. Therefore, little error is generated in a flat image where most DCT coefficients have a zero value even though only some DCT coefficients are decoded. When a clear sky is discrete cosine transformed, errors may not be generated even though only one DCT coefficient is transformed. In FIG. 2, it is assumed that a block size is 8×8 for convenience' sake. However, it is understood by anyone skilled in the art that the present invention is applied to blocks of different sizes such as 4×4 and 16×16.

Figure 3:
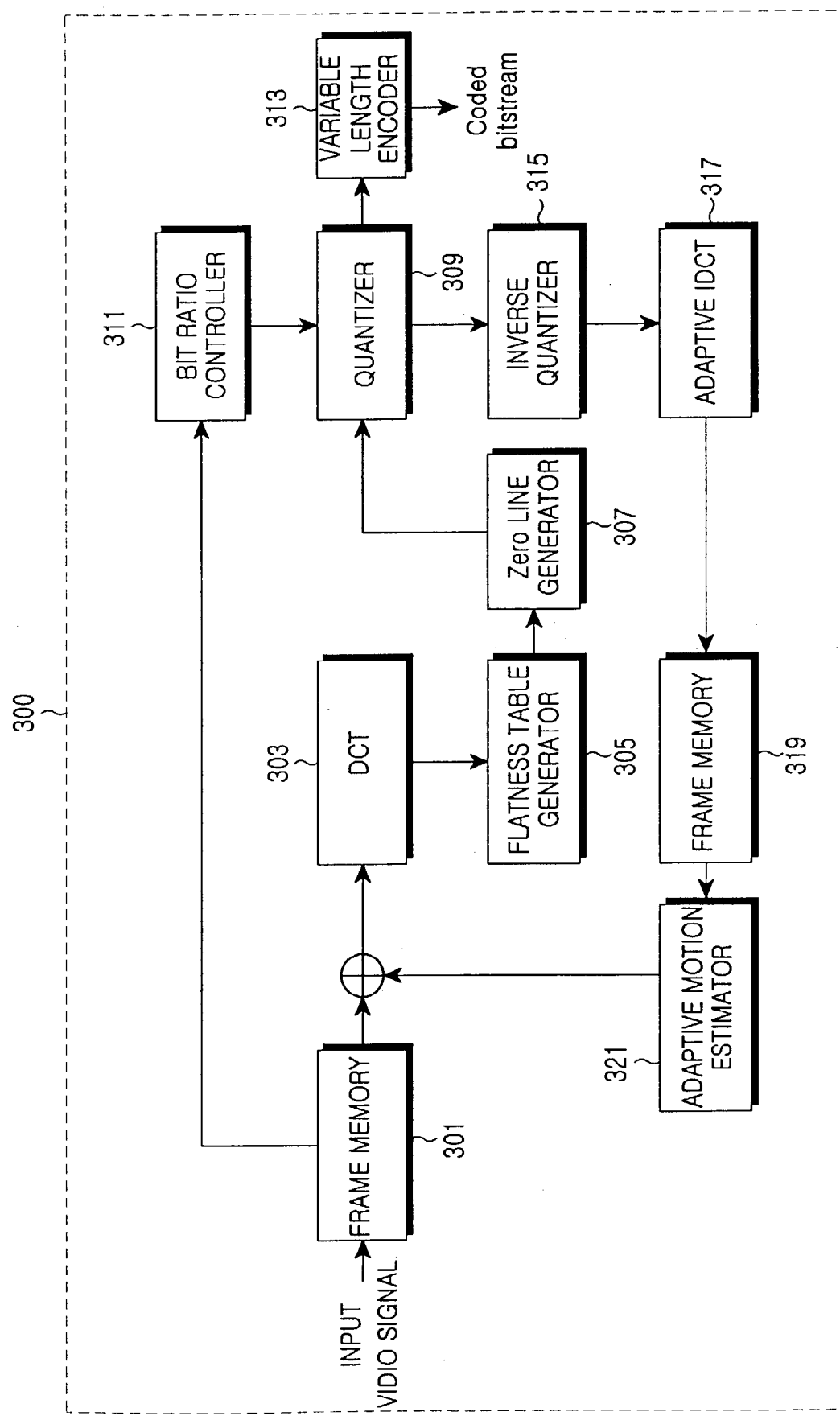
FIG. 3 is a block diagram illustrating a system for performing image coding and motion estimation (ME) in consideration of characteristics of an image according to a preferred embodiment of the present invention.

According to the present invention, calculation complexity of an encoding process and a ME process can be reduced in consideration of characteristics of an encoded image. FIG. 3 illustrates a system for performing image coding and motion estimation (ME) in consideration of characteristics of an image according to a preferred embodiment of the present invention.

A frame-type input video signal is input to a frame memory 301 in units of blocks and is stored. A DCT 303 discrete cosine transforms an input video signal read from the frame memory 301 in units of blocks and generates DCT coefficients. A flatness table generator 305 determines the number of non-zero DCT coefficients among the DCT coefficients of the block. DCT coefficients having a value that is not zero but less than a reference value are considered to have a value of zero. According to the present invention, it is assumed that at least some of the DCT coefficients have a value less than the reference value. The reference value may be a specific constant, however, it is preferably that quantization values of a quantization table corresponding to the block are used. This is because the DCT coefficients having a value less than the quantization value have a zero value in a quantization process.

The flatness degree of the block is determined according to the number of non-zero DCT coefficients. According to the present specification, the flatness degree is determined according to the number of non-zero coefficients included in a corresponding block. The flatness table generator 305 stores flatness degrees of the respective blocks of a frame in a table. A zero line generator 307 replaces DCT coefficients determined to have a value less than a reference value (previously set by the flatness table generator 305 ) with a value of 0. In FIG. 3, the flatness table generator 305 and the zero line generator 307 are illustrated to be separate from each other. However, the two apparatuses can be realized in one apparatus.

Figure 4:
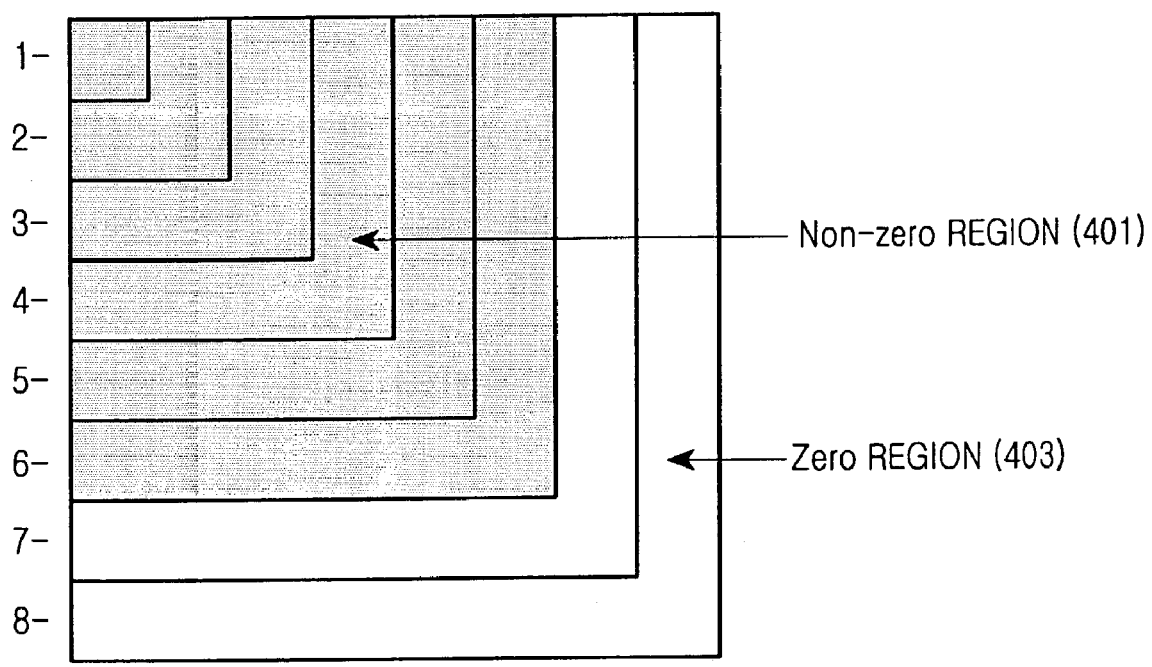
FIG. 4 illustrates the DCT coefficients of a 8×8 block after passing through a flatness degree generator and a zero line generator according to an embodiment of the present invention.

FIG. 4 illustrates an exemplary distribution of the DCT coefficients of an 8×8 block after passing through the flatness table generator 305 and the zero line generator 307. Reference numeral 401 denotes a region of DCT coefficients having a value that is not zero. Reference numeral 403 denotes a region of DCT coefficients having a zero value. Therefore, the flatness degree of the block is determined to be 6.

A quantizer 309 quantizes input DCT coefficients using a quantization table determined by a bit ratio controller 311. The quantized DCT coefficients are scanned in zigzags and transformed to variable length encoded data by a variable length coder 313 and are output as a continuous bit stream encoded by a bit stream generator (not shown).

The quantized DCT coefficients are inverse quantized by an inverse quantizer 315 and are input to an adaptive inverse discrete cosine transformer (IDCT) 317. The adaptive IDCT 317 inverse discrete cosine transforms the DCT coefficients, the number of DCT coefficients having been determined according to the flatness degree of a corresponding block determined by the flatness table generator 305. In a block whose flatness degree is low, that is, a visually flat or uniform image, a small number of DCT coefficients are inverse discrete cosine transformed. In a block whose flatness degree is high i.e., a large degree of contrast, a large number of DCT coefficients are inverse discrete cosine transformed. According to a conventional technology, 64 DCT coefficients are inverse discrete cosine transformed. According to the present invention, a smaller number of DCT coefficients are transformed according to the flatness degree. Therefore, in inverse discrete cosine transformation using [Equation 1] having the calculation complexity of $O(n^3)$, 512 multiplication operations must be performed in the case of a 8×8 block according to a conventional technology. According to the present invention, 216 multiplication operations are performed when the flatness degree is 6 according to the present invention. 64 multiplication operations are performed when the flatness degree is 4.

The recovered pixel data in units of blocks is stored in a frame memory 319 so as to be used as a reference frame for ME. After the entire blocks of a first image frame are processed by the encoding system 200, a second image frame is input to the encoding system 200. An adaptive motion estimator 321 compares the pixels of the search region with the pixels of a first macro block (MB) of the second frame by the pixel distance determined by the flatness degree of the search region of a reference frame.

Figure 5:
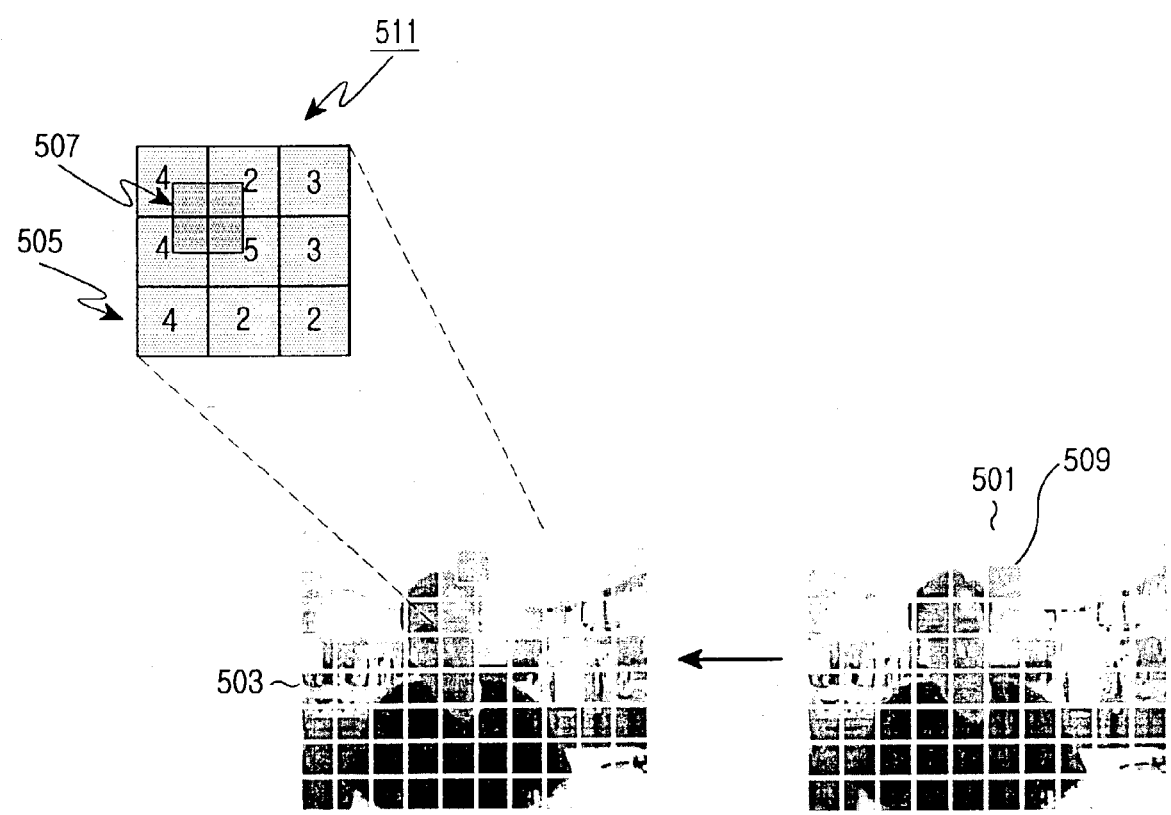
FIG. 5 illustrates a block comparison method in consideration of flatness degree according to a preferred embodiment of the present invention.

Three methods will now be described with reference to FIG. 5 as preferred embodiments of a block comparison method according to the flatness degree. However, various changes may be made using methods other than the three methods below without departing from the scope of the present invention. Also, for the convenience of explanation, it is assumed that the search region of the reference frame is formed of 3×3 candidate MBs. In FIG. 5, reference numeral 501 denotes a currently input second video frame. Reference numeral 509 denotes a MB whose current motion is to be estimated in the second video frame. Reference numeral 503 denotes a reference frame stored in the frame memory 319. Reference numeral 505 denotes a search region for estimating motion of the MB 509. The search region 505 is formed of nine candidate MBs 911. Reference numeral 507 denotes a reference region currently compared with the MB 509 in the search region 505.

In a first method, a pixel distance is determined on the basis of the highest flatness degree among the flatness degrees of candidate MBs, over which the reference region 507 extends. When this method is used, the pixel distance is determined on the basis of 5, the highest flatness degree among four MBs.

In a second method, each pixel distance is determined according to the flatness degree of each candidate MB, over which the reference region 507 extends. In this case, the pixel distances are determined on the basis of flatness degree of four on the left of the reference region 507, on the basis of flatness degree of two on the right upper end, and on the basis of flatness degree of five on the right lower end.

In a third method, the pixel distance is determined on the basis of the flatness degree of the candidate MB that extends over the widest region among the candidate MBs, over which the reference region 507 extends. That is, in the case of FIG. 5, the pixel distance is determined on the basis of the flatness degree of four.

Various common search algorithms such as a full searching block matching algorithm (FBMA), three step search (TSS), diamond search, and hierarchical motion estimation may be used for the block comparison.

Figure 6:
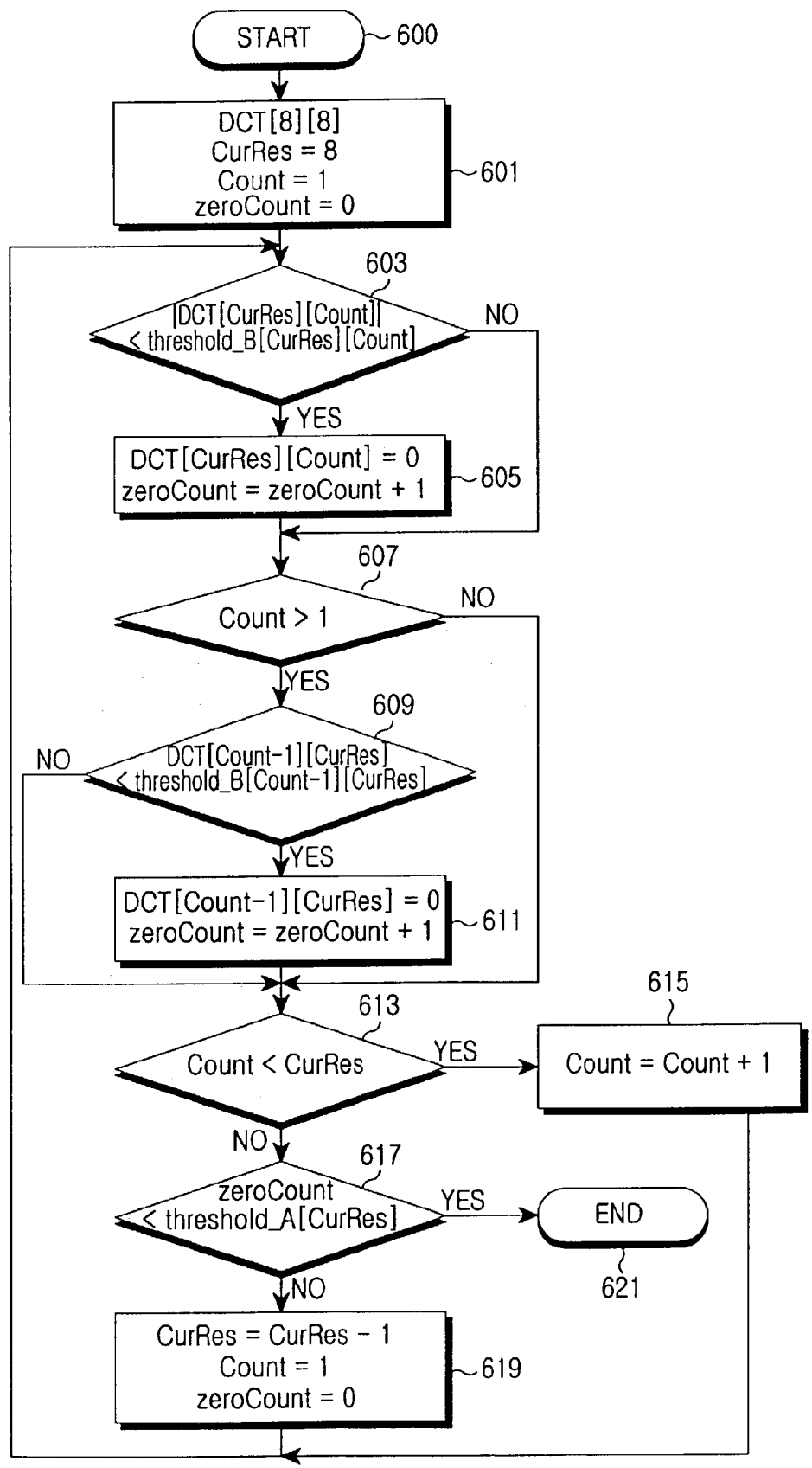
FIG. 6 is a flowchart illustrating processes of determining the flatness degree of a DCT block according to a preferred embodiment of the present invention.

FIG. 6 is a flowchart illustrating processes of determining the flatness degree of a DCT block. A method for determining the flatness degree of an 8×8 DCT block by a flatness table generator 305 and a zero line generator 307 with reference to FIGS. 4 and 6.

When DCT coefficients are input from a DCT 303, the process proceeds to step 601 and the flatness table generator 305 starts a process of determining a flatness degree. The flatness degree determining process starts from DCT coefficients of a high frequency component and proceeds to DCTs of a low frequency component, that is, from a region whose flatness degree is 8 of FIG. 4 to a region whose flatness degree is 1. At step 601, DCT[8][8]. that is a 8×8 two dimensional arrangement for storing DCT coefficients, is prepared. CurRes that is a variable for expressing the flatness degree is set as 8. "Count," which is a variable for counting tested DCT coefficients, is set as 1. "zeroCount," which is a variable for counting the number of DCT coefficients having a zero value, is set as zero.

At step 603, a DCT[CurRes][Count] coefficient value, that is DCT coefficients to be currently tested, is compared with a previously set reference value, threshold_B[CurRes][Count]. Threshold_B[CurRes][Count] is a reference value for determining DCT coefficients having a non-zero value, which is a quantization value corresponding to the DCT coefficients in a quantization table or a value obtained by multiplying a specific weight value by the quantization value. Because CurRes is 8 and Count is 1, DCT[8][1] coefficient value is compared with a threshold_B[8][1] value. At step 603, the values of DCT[8][1], DCT[8][2], . . . , DCT[8][8] coefficients are compared with corresponding reference values.

When the DCT coefficient is smaller than the reference value, at step 605, the flatness table generator 305 determines that the DCT coefficient has a zero value and increases the "zeroCount." The zero line generator 307 replaces the value of the DCT coefficient by zero and proceeds to step 607. When the currently tested DCT coefficient is larger than the reference value at step 603, the process proceeds to step 607.

At step 607, Count is compared with 1 and the current Count is 1, the process proceeds to step 613. At step 613, Count is compared with CurRes. Because the current Count is smaller than CurRes, the step proceeds to step 615 and, after increasing Count by one, the process returns to step 603. Accordingly, Count becomes 2.

At steps 603 and 605, it is determined whether the value of DCT[8][2] is zero (see FIG. 6) and the process proceeds to step 607. Because the current Count is larger than 1 at step 607, the process proceeds to step 609. At step 609, the coefficient value of DCT[Count−1][CurRes] is compared with threshold$_{13}$ B[1][8]. At step 609, the values of DCT[1][8], DCT[2][8], . . . , DCT[7][8] coefficients are compared with corresponding reference values.

When the value of the DCT[1][8] coefficient is smaller than the value of the threshold_B[1][8], the process proceeds to step 611. At step 611, the flatness table generator 305 determines that the DCT coefficient has a zero value and increases zeroCount by one. The zero line generator 307 replaces the value of the DCT coefficient by zero and the process proceeds to step 613. The routine processes are repeated until Count becomes 8. The number of DCT coefficients having a value smaller than threshold_B in the region whose flatness degree is 8 is counted through zeroCount.

When Count becomes 8, at step 613, the value of the zeroCount is compared with the value of threshold_A[CurRes]. The threshold_A[CurRes] is a reference value previously set in each flatness region. In a lower frequency region, more DCT coefficients having a zero value exist. Therefore, it is preferable that the value of threshold_A is set to be larger in a lower frequency region. However, the value of the threshold_A may be set to be the same in all regions or may be set according to other methods.

When the number of DCT coefficients having a zero value is smaller than that of the threshold_As at step 617, the current CurRes is determined as the flatness degree of the current block at step 619 and flatness degree determining routines are terminated at step 621. However, when the number of DCT coefficients having a zero value is larger than that of the threshold_As, at step 619, CurRes is increased by one, Count and zeroCount are initialized, and the number of coefficients having a zero value among the DCT coefficients of the next region is counted.

A method for determining the flatness degree of a block was described with reference to FIGS. 4 and 6. The flatness table generator determines the flatness degree of all blocks of a video frame by applying the routines to the entire video frames and generates a two-dimensional flatness table.

A method for estimating motion referring to the determined flatness degree will now be described with reference to FIGS. 7 and 8. It is assumed that a video frame is formed of 176×144 pixels and that a MB for estimating motion has an 8×8 size. Therefore, a video frame is formed of 22×18 MBs. However, it is understood by one skilled in the art that the present invention can be applied to a MB of a 16×16 size, which is often used in MPEG-2 or MPEG-4.

Figure 7:
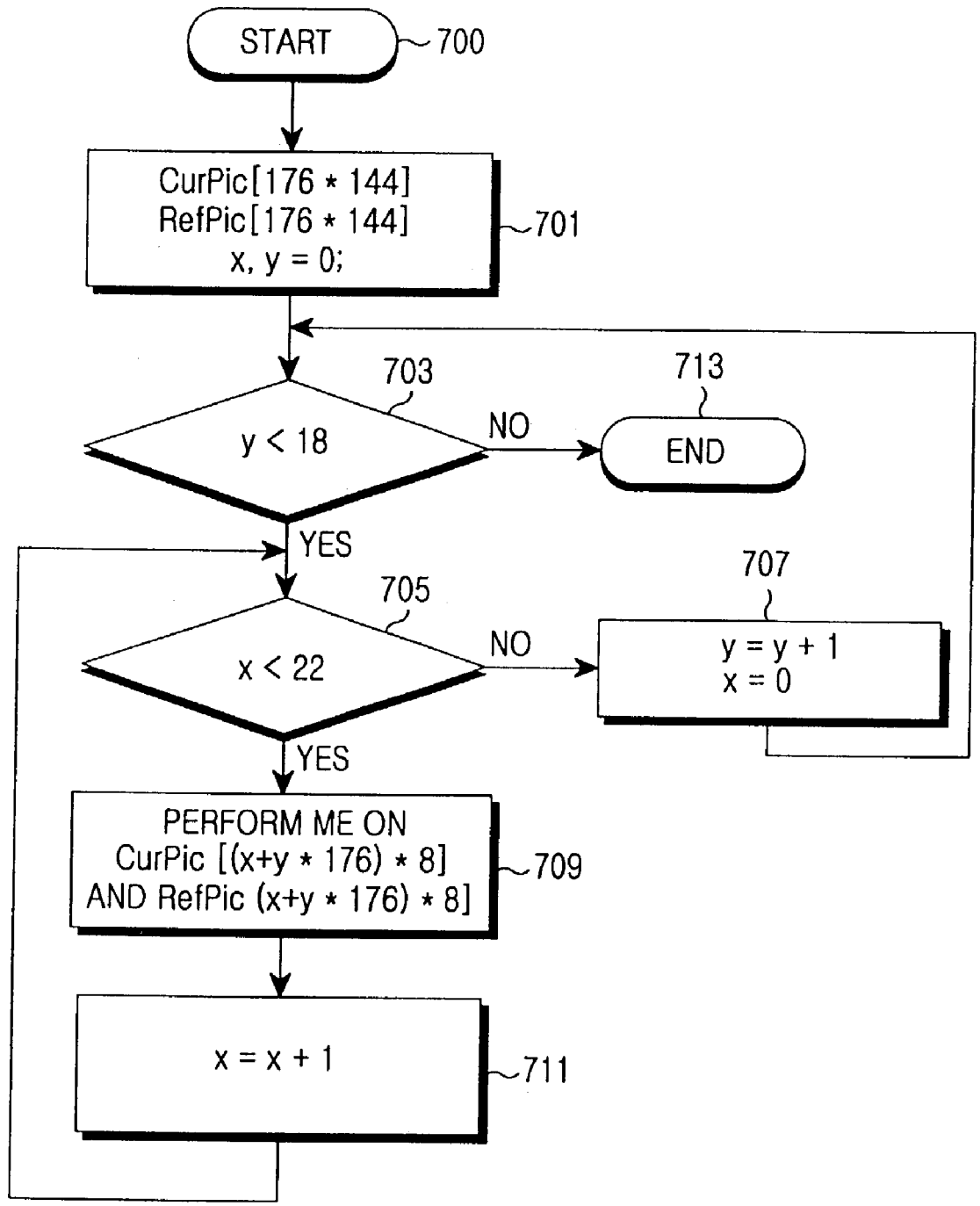
FIG. 7 is a flowchart illustrating processes of estimating motion with respect to all of the macro blocks (MB) of an image frame in an adaptive motion estimator according to a preferred embodiment of the present invention.
Figure 8:
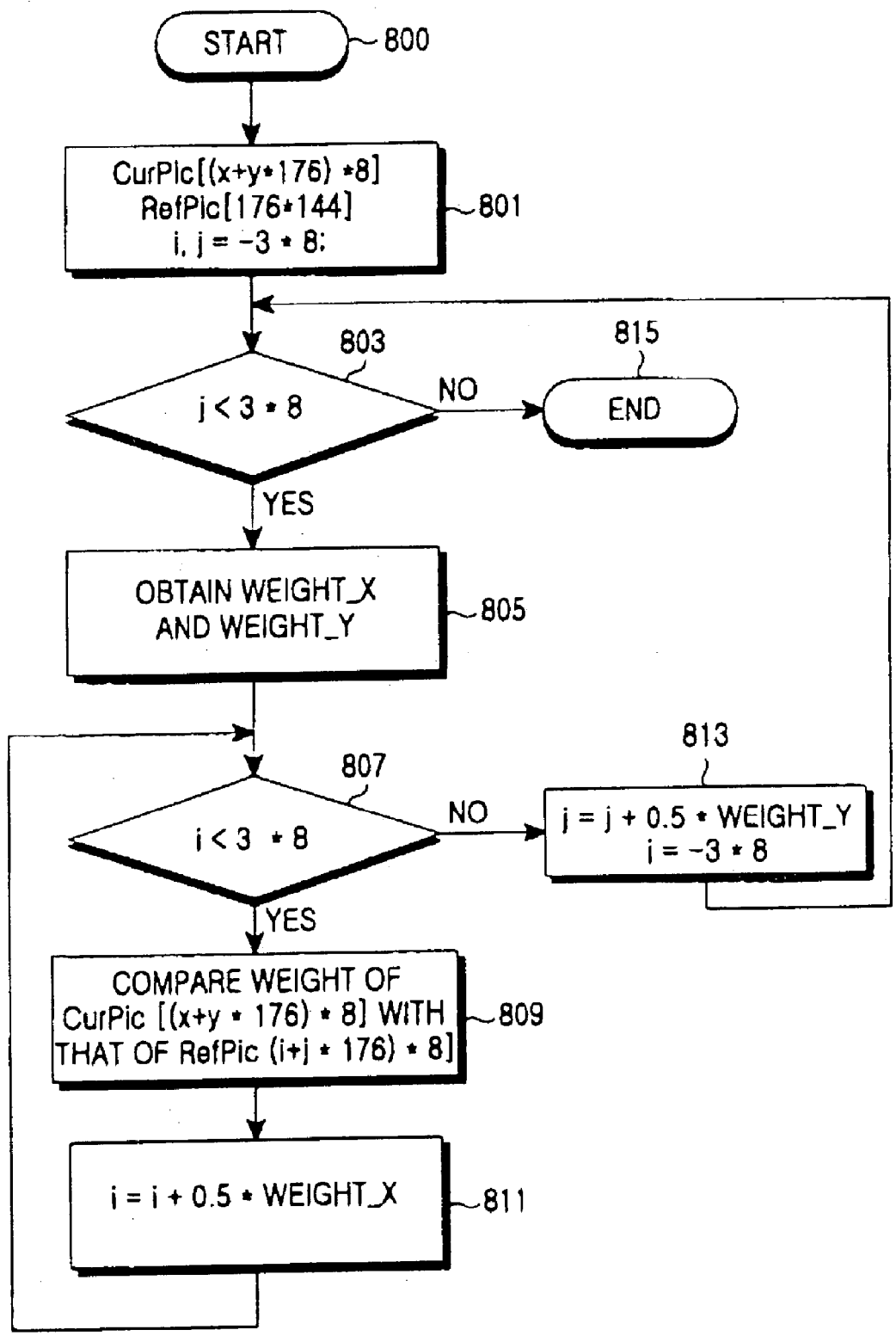
FIG. 8 illustrates processes of estimating motion of a MB according to a preferred embodiment of the present invention.

FIG. 7 is a flowchart illustrating processes of estimating motion of all MBs of a video frame by the adaptive ME 321 of FIG. 3. At step 701, CurPic[176*144] denotes a current image buffer and RefPic[176*144] denotes a reference image buffer. The variables x and y are for counting the number of MBs in the directions of the x and y axes and are initialized to zero.

At step 703, when y is smaller than 18, the process proceeds to step 705. When y is larger than 18, the process proceeds to step 413 and the process is terminated because the ME for all MBs of a video frame is completed. Because initially y is 0, the process proceeds to step 705. At step 705, x is compared with 22. Because x is initially 0, the process proceeds to step 709. At step 709, the ME is performed on the current MB CurPic[(x+y*176)*8] and a reference region RefPic[(x+y*176)*8]. The ME method will now be described with reference to FIG. 8. When the ME on the current MB is completed, x is increased by one and the steps 705 to 711 are repeated. When the ME on the MBs of a first line is completed and x reaches 22, the process proceeds to step 707, y is increased by one, x is initialized to zero, and the process returns to the step 703. When the ME on all MBs of an image frame is completed, the ME is completed at step 713.

A ME method for a MB in the step 709 will now be described in detail with reference to FIG. 8. At step 801, CurPic[(x+y*176)*8] is a MB whose current motion is to be estimated. The variables i and j are for presenting the position of a reference region in the search region of a reference frame using the current MB as a reference point. It is assumed that the left direction along the x axis on the basis of the current MB is the −i direction, that the right direction along the x axis is the +i direction, that the upper direction along the y axis is the +j direction, and that the lower direction along the y axis is the −j direction. It is assumed that the FBMA (full searching block matching algorithm) algorithm is used among the various searching algorithms. (The FMBA is a pixel-by-pixel searching method, where searching is all around the picture.) Also, it is assumed that the search region of the reference frame includes three MBs in the each of x and y axes directions on the basis of the current MB. Three MBs is an example, however, and the search region of the frame can be more or less. In addition, the present invention can be applied to a case where other search algorithms are used or the size of the search region varies.

At step 803, when j is smaller than 3*8, the process proceeds to step 805. At step 805, the flatness degree of a reference region is read from the flatness table. When the reference region extends over a plurality of candidate MBs, the flatness degree is determined by the method described in FIG. 5. Weight_X and weight_Y are determined according to the determined flatness degree along the x and y axes, respectively. For example, when the flatness degree is 4, the weight_X and the weight_Y are 4. When the flatness degree is 2, the weight_X and the weight_Y are 2. Because the current j is −3*8 and is smaller than 3*8, the process proceeds to step 805 and the weights are obtained. Then, the process proceeds to step 807.

When i is smaller than 3*8 in the step 807, at step 809, CurPic[(x+y*176)*8] and RefPic[(i+j*176)*8] blocks are compared with each other according to the weights determined in the step 805 in units of subsampled pixels. For example, when the weights are 2, subsampling is performed according to pixel distance of one. When the weights are 4, subsampling is performed according to pixel distance of 2. Therefore, an amount of operations is significantly reduced than in a conventional technology where all of the pixels in a MB are compared with each other. It is understood by one skilled in the art that the comparison of pixels can be performed using well-known algorithms such as sum of absolute differences (SAD) and dispersion.

When the comparison of the pixels is completed, the i value is increased according to the weight_X at step 811. The reference region is moved in the search region by the pixel units increased according to the weight_X. Then, the comparison of the pixels is performed. For example, when the weight_X is 2, the reference region is moved by one pixel. When the weight_X is 4, the reference region is moved by two pixels. In a conventional technology, the reference region in the search region is moved in units of a half-pixel. However, according to the present invention, the motion pixel unit, that is, the search precision of the reference region is determined reflecting the flatness degree determined by the characteristic of an image.

When the comparison of the pixels for the candidate MBs positioned lowest in the search region is completed, that is, i is larger than or equal to 3*8, the process proceeds from step 807 to step 813. At step 813, the j value is increased according to the weight_Y and i is initialized to 3*8. Then, the process returns to step 803. When the comparison of the pixels for all of the search regions is completed, the process proceeds to step 815 and is terminated. As mentioned above, according to the present invention, the amount of operations is significantly reduced by determining the pixel comparison distance and the search precision of the reference region in consideration of the characteristics of an image.

As mentioned above, according to the present invention, in a system of removing spatial overlap by DCT transforming an image in units of blocks and of removing temporal overlap using a ME technique, when a flat image extends over a wide block, the number of DCT coefficients to be inverse discrete cosine transformed in order to generate the reference frame used for the ME is significantly reduced. Accordingly, calculation complexity is reduced. Also, an amount of operations is reduced by controlling the precision of the pixel comparison and the search precision according to the flatness degrees of the blocks of the reference frame in a block matching process.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for encoding a video signal for simplifying motion estimation (ME) in a video frame compression system using discrete cosine transform (DCT), comprising the steps of:
 (a) generating DCT coefficients by transform video data input in units of blocks;
 (b) determining flatness degrees of the blocks according to the number of DCT coefficients having a non-zero value among DCT coefficients transformed in units of blocks;
 (c) forming a reference frame by recovering video frame data from some or all of the DCT coefficients corresponding to the flatness degrees of the blocks; and
 (d) dynamically changing a precision of a motion estimation (ME) for a current macro block (MB) of a current video frame according to the flatness degree of the reference frame.

2. The method of claim 1, wherein step (d) further comprises the step of determining a reference region of the reference frame and a pixel comparison distance of a current video frame according to the flatness degree.

3. The method of claim 1, wherein step (d) further comprises the step of moving the reference region of the reference frame according to a search precision as determined according to the flatness degree.

4. The method of claim 3, wherein the search precision is a multiple pixel unit of the reference region.

5. The method of claim 1, wherein step (a) further comprises comparing the DCT coefficients with a predetermined first reference value and replacing the value of the DCT coefficients having a value smaller than the first reference value with a value of zero.

6. The method of claim 5, wherein the first reference value is determined by quantization tables corresponding to the respective blocks.

7. The method of claim 1, wherein step (a) further comprises comparing the number of DCT coefficients having a non-zero value with a predetermined second reference value.

8. A method for compressing a video frame for transforming input video data input in units of blocks from a spatial region to a frequency region by a discrete cosine transform DCT) and encoding transform coefficients generated in the transform in a video frame compression system, comprising the steps of:
(a) determining flatness degrees of corresponding blocks according to values of DCT coefficients and the number of DCT coefficients having a non-zero value among DCT coefficients transformed in units of blocks;
(b) inverse transforming the DCT coefficients from a frequency region to a spatial region with reference to the flatness degrees of the blocks, and recovering video data;
(c) estimating a region most similar to current video data among the recovered video data with reference to the flatness degrees of the blocks; and
(d) inputting errors of the motion estimated region and the current video data to a DCT.

9. The method of claim 8, wherein step (a) further comprises determining the flatness degree according to the number of DCT coefficients having a non-zero value among the DCT coefficients of the respective blocks.

10. The method of claim 8, wherein step (d) further comprises comparing the pixels of current video data with the pixels of the video data by a pixel comparison distance determined by the flatness degree.

11. The method of claim 10, wherein step (d) further comprises comparing the pixels of the reference region of the recovered video data with the pixels of the current video data and moving the reference region in the recovered video data in units of pixels determined by the flatness degree.

12. A method for encoding video frame data input in units of blocks in order to compress a video frame in a video frame compression system, comprising the steps of:
transforming video frame data in units of blocks to discrete coefficient transform (DCT) coefficients by a DCT;
determining flatness degrees of the blocks according to values of DCT and the number of DCT coefficients having a non-zero value among DCT coefficients of the blocks;
quantizing the DCT coefficients by a quantizer and encoding the quantized DCT coefficients by an encoder;
inverse quantizing the quantized DCT coefficients by an inverse quantizer;
inverse transforming at least some of the inverse quantized DCT coefficients corresponding to the flatness degrees of the blocks and recovering video frame data, to thus form a reference frame;
comparing pixels of macro blocks (MBs) of a current video frame with pixels of a reference region of the reference frame by a uniform pixel distance to determine the most similar region and determining the uniform pixel distance according to the flatness degrees of blocks belonging to a search region between the MB and the reference region; and
inputting a difference between a current MB of the current video frame and the most similar region to the DCT as video data.

13. An apparatus for performing encoding using discrete cosine transform (DCT) and motion estimation (ME), comprising:
a DCT for transforming video data input in units of blocks and generating DCT coefficients;
a flatness degree determiner for calculating the number of DCT coefficients having a non-zero value among the generated DCT coefficients and determining the flatness degrees of corresponding blocks according to that number;
an inverse discrete cosine transform (IDCT) for decoding some or all of the DCT coefficients corresponding to the flatness degrees of the blocks and recovering original video data;
a motion estimator for comparing the pixels of a current block of a current input video frame with pixels of a search region of the reference frame by a uniform pixel distance to determine the most similar region and determining the pixel distance according to the flatness degrees of blocks included in a search region of the reference frame; and
an adder for inputting a difference between the current block of the current video frame and the most similar region to the DCT as video data.

14. The apparatus of claim 13, wherein the flatness degree determiner compares the DCT coefficients with a predetermined first reference value and replaces the value of the DCT coefficients having a value smaller than the first reference value by zero.

15. The apparatus of claim 13, wherein the motion estimator moves the search region in units of pixels determined by the flatness degree and compares the pixels of the current block of the current video frame with the pixels of the search region.

16. A system for compressing a video frame for transforming input video data input in units of blocks from a spatial region to a frequency region by a discrete cosine transform (DCT) and encoding DCT coefficients generated in the transform process, comprising:
a flatness degree determiner for determining the flatness degrees of corresponding blocks according to the values of the DCT coefficients and the number of DCT coefficients having a non-zero value among the DCT coefficients of the blocks;
an inverse discrete cosine transform (IDCT) for inverse transforming the DCT coefficients from a frequency region to a spatial region with reference to the flatness and inverse discrete cosine transforming video data;
a motion estimator for estimating the region most similar to current video data among the recovered video data with reference to the flatness degree; and
an adder for inputting errors of the motion estimated region and the current video data to the DCT.

17. The system of claim 16, wherein the motion estimator compares the pixels of the current video data with the pixels of the inverse discrete cosine transformed video data by a pixel comparison distance determined by the flatness degree.

18. The system of claim 16, wherein the motion estimator compares the pixels of the reference region of the inverse discrete cosine transformed video data with the pixels of the current video data and moves the reference region in the recovered video data in units of pixels determined by the flatness degree.

* * * * *